(12) United States Patent
Wang et al.

(10) Patent No.: US 8,642,671 B2
(45) Date of Patent: Feb. 4, 2014

(54) INTERPENETRATING POLYMER NETWORK AND METHOD FOR MAKING THE SAME

(71) Applicants: Li Wang, Beijing (CN); Xiang-Ming He, Beijing (CN); Jian-Jun Li, Beijing (CN); Jian Gao, Beijing (CN); Chang-Yin Jiang, Beijing (CN)

(72) Inventors: Li Wang, Beijing (CN); Xiang-Ming He, Beijing (CN); Jian-Jun Li, Beijing (CN); Jian Gao, Beijing (CN); Chang-Yin Jiang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/653,607

(22) Filed: Oct. 17, 2012

(65) Prior Publication Data

US 2013/0158152 A1 Jun. 20, 2013

(30) Foreign Application Priority Data

Dec. 17, 2011 (CN) .......................... 2011 1 0423656

(51) Int. Cl.
| | | |
|---|---|---|
| *C03C 25/10* | (2006.01) | |
| *C08F 2/50* | (2006.01) | |
| *C08F 2/46* | (2006.01) | |
| *B29C 71/04* | (2006.01) | |
| *A61L 2/08* | (2006.01) | |
| *A61L 24/00* | (2006.01) | |
| *C08G 61/04* | (2006.01) | |

(52) U.S. Cl.
USPC .......... 522/42; 522/33; 522/6; 522/1; 522/71; 522/189; 522/184; 520/1

(58) Field of Classification Search
USPC ............. 522/42, 33, 6, 1, 71, 189, 184; 520/1
See application file for complete search history.

(56) References Cited

U.S. PATENT DOCUMENTS

| | | | | |
|---|---|---|---|---|
| 5,102,924 | A * | 4/1992 | Williams et al. ................... 522/4 |
| 2005/0107564 | A1* | 5/2005 | Klingenberg et al. .......... 528/44 |
| 2007/0269747 | A1* | 11/2007 | Bahadur et al. ............... 430/319 |
| 2009/0182068 | A1* | 7/2009 | Liu ............................... 523/108 |

* cited by examiner

*Primary Examiner* — Ling Choi
*Assistant Examiner* — Jessica E Whiteley
(74) *Attorney, Agent, or Firm* — Altis Law Group, Inc.

(57) ABSTRACT

An interpenetrating polymer network includes $-(CH_2-CH_2-O)_n-$ segments, and is formed by polymerizing a first monomer $R_1-O-(CH_2-CH_2-O)_n R_2$ with a second monomer $R_3-O-(CH_2-CH_2-O)_m R_4$ under an initiator. Each "$R_1$", "$R_2$" and "$R_3$" includes $-C=C-$ group or $-C\equiv C-$ group. The "$R_4$" includes an alkyl group or a hydrogen atom. The "m" and "n" are integer. Molecular weights of the first monomer and the second monomer are more than or equal to 100, and less than or equal to 800. The first monomer is less than or equal to 50% of the second monomer by weight. A method for making the interpenetrating polymer network is also provided.

9 Claims, 3 Drawing Sheets

INTERPENETRATING POLYMER NETWORK AND METHOD FOR MAKING THE SAME

RELATED APPLICATIONS

This application claims all benefits accruing under 35 U.S.C. §119 from China Patent Application No. 201110423656.0, filed on Dec. 17, 2011 in the China Intellectual Property Office, the disclosure of which is incorporated herein by reference. This application is related to applications entitled "SOLID ELECTROLYTE AND LITHIUM BASED BATTERY USING THE SAME", filed Oct. 16, 2012 Ser. No. 13/652,807; "SOLID ELECTROLYTE AND LITHIUM BASED BATTERY USING THE SAME", filed Oct. 16, 2012 Ser. No. 13/652,813; and "METHOD FOR MAKING SOLID ELECTROLYTE", filed Oct. 16, 2012 Ser. No. 13/652,824.

BACKGROUND

1. Technical Field

The present disclosure relates to an interpenetrating polymer network (IPN) and a method for making the same.

2. Discussion of Related Art

Electrolytes are important components of lithium based batteries. Solid electrolytes, especially solid polymer electrolytes, are non-volatile, non-explosive, flexible, and electrochemically stable. The polymers with

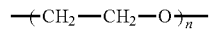

segments are compatible with general lithium salts and can be used as solid electrolyte matrixes. However, the polymers with

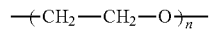

segments have high crystallization degrees, which make the solid electrolytes using the polymers to have low ion conductivities and bad thermal stabilities.

What is needed, therefore, is to provide an IPN including

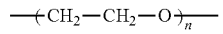

segments and a method for making the IPN, to overcome the above-mentioned shortages.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

An IPN of one embodiment is provided. The IPN includes

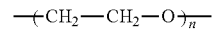

segments, and is formed by polymerizing a first monomer

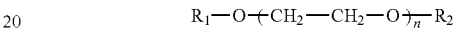

with a second monomer

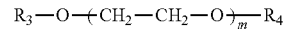

under an initiator. Wherein each "$R_1$", "$R_2$" and "$R_3$" includes an unsaturated group with —C=C— group or —C≡C— group. "$R_4$" is an alkyl group or a hydrogen (H) atom. The alkyl group can be methyl (—$CH_3$), ethyl (—$CH_2$—$CH_3$), or propyl (—$CH_2$—$CH_2$—$CH_3$ or —CH—($CH_3)_2$), "m" and "n" each represents an integer number. The first monomer is less than or equal to 50% of the second monomer by weight.

A molecular structure of the IPN can be a linear and open-loop structure. In one embodiment, the molecular structure of the IPN is substantially a branch structure, like a tree. The IPN can be substantially a branch structure. The "$R_1$" and "$R_2$" of the first monomer and "$R_3$" of the second monomer specifically each can include unsaturated chain hydrocarbon groups or unsaturated chain hydrocarbon groups with carbonyl, such as, ethenyl (—CH=$CH_2$), ethynyl (—C≡CH), allyl (—CH=CH—$CH_3$, or —($CH_3$)C=$CH_2$), propinyl (—C≡C—$CH_3$), or ethenyl ketonic group

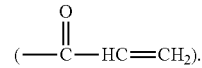

The "$R_1$", "$R_2$" and "$R_3$" in a same IPN can be the same groups or different groups. The alkyl group used as "$R_4$" can be methyl (—$CH_3$), ethyl (—$CH_2$—$CH_3$), or propyl (—$CH_2$—$CH_2$—$CH_3$ or —CH—($CH_3)_2$). In one embodiment, the first monomer is PEG200diA, and the second monomer is PEG350 mA.

Molecular weights of the first and second monomers can be greater than or equal to 100, and less than or equal to 800, respectively. In one embodiment, the molecular weights of the first and second monomers can be greater than or equal to 200, and less than or equal to 600, respectively. In one embodiment, the first monomer is less than or equal to 20% of the second monomer by weight.

The initiator is to make the first and second monomers form free radicals and polymerize into the IPN. The initiator can be a thermo-initiator or a photo-initiator. The thermo-initiator can be chloride gas, bromine gas, organic peroxide, or azo initiator. The photo-initiator can be 1-hydroxy-cyclohexyl phenyl ketone (HCPK), 2-methyl-1-[4-(methylthio)-phenyl]-2-morpholino-propiopheno (MMMP), or dimethylol propionic acid (DMPA).

Figure 1:
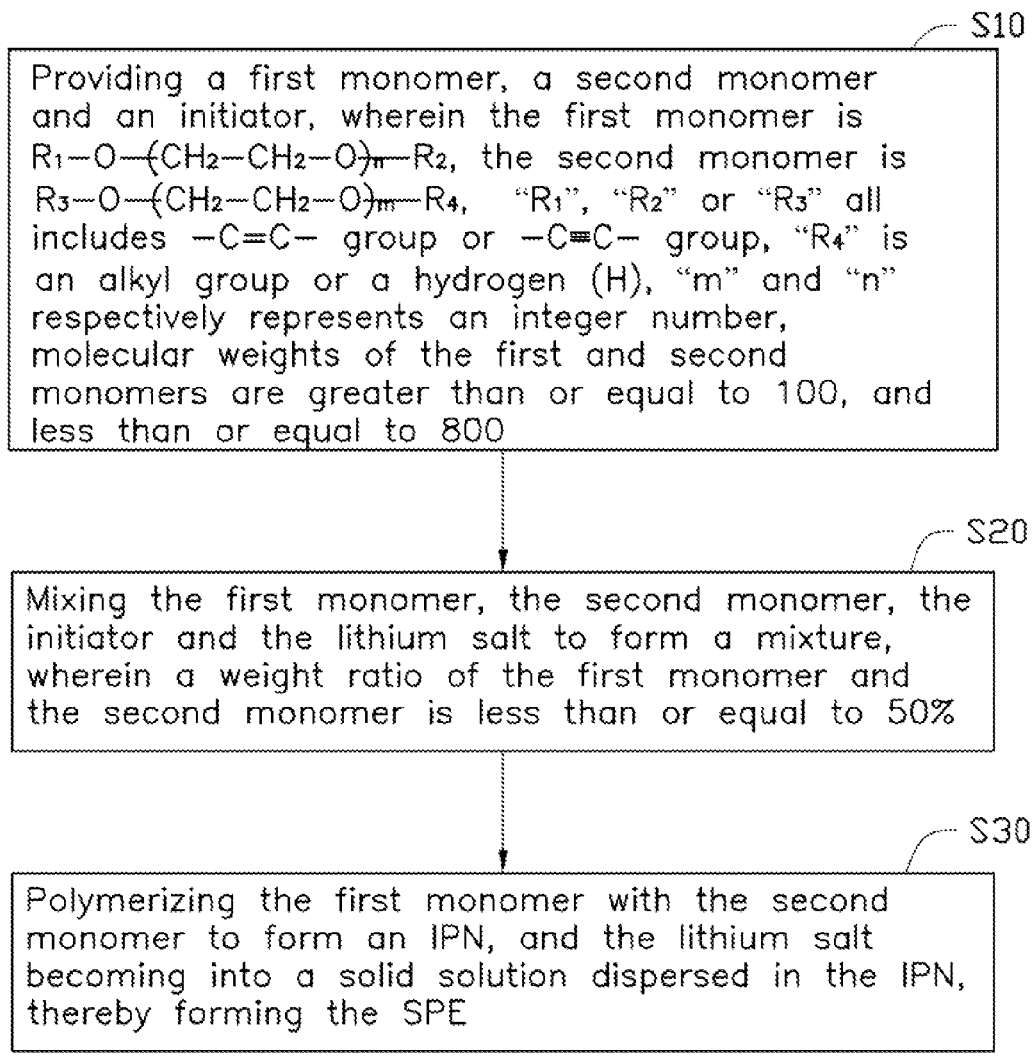
FIG. 1 shows a flowchart of a method for making an IPN of one embodiment.

Referring to FIG. 1, one method for making the IPN of embodiment is provided. The method includes the following steps:

S10, providing a first monomer, a second monomer and an initiator, wherein the first monomer is

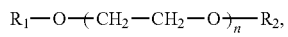

the second monomer is

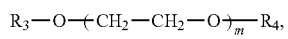

each "$R_1$", "$R_2$" and "$R_3$" can include —C=C— group or —C≡C— group, "$R_4$" can be an alkyl group or a hydrogen (H), "m" and "n" respectively represents an integer number, molecular weights of the first and second monomers are greater than or equal to 100, and less than or equal to 800, respectively;

S20, mixing the first monomer, the second monomer and the initiator to form a mixture, wherein a weight ratio of the first monomer to the second monomer is less than or equal to 50%; and S30, polymerizing the first monomer with the second monomer under the initiator, thereby forming the IPN.

In step S10, the initiator is selected by the pre-polymerizing groups of the first and second monomers. The initiator can vary according to the first and second monomers.

Step S20 can include: firstly, mixing the first and second monomers to form a first mixture; next, adding the initiator into the first mixture to form the mixture; and then agitating the mixture. The initiator in the mixture is less than 1% of the second monomer by weight.

If the initiator is the photo-initiator, step S30 can include the sub-steps of: putting the mixture into a protective gas; using a UV light to irradiate the mixture to substantially polymerize the first monomer with the second monomer under the photo-initiator to form the IPN; and heating the IPN to obtain a dried IPN. The protective gas can be an inert gas, such as nitrogen gas, helium gas, neon gas, argon gas, krypton gas or xenon gas. An irradiating period of UV light is in a range from about 30 minutes to about 2 hours. In one embodiment, the irradiating period ranges from about 45 minutes to about 1.5 hours. The irradiating period can be determined by the weights and types of the first and second monomers. A wavelength of the UV light can be about 365 nanometers. The IPN is heated to a first temperature for a first heating time, to remove the solvent used in the process of forming the IPN, and the first temperature ranges from about 50 centigrade degrees to about 100 centigrade degrees. In one embodiment, the first temperature is in a range from about 60 centigrade degrees to about 90 centigrade degrees. The first heating time ranges from about 5 hours to about 24 hours. In one embodiment, the first heating time is in a range from about 7 hours to about 12 hours.

When the initiator is the thermo-initiator, the step S30 is mainly made by a thermal polymerization method. The method can include the following sub-steps of: putting the mixture into the protective gas; and heating the mixture to a second temperature for a second heating period, to substantially polymerize the first monomer with the second monomer under the thermo-initiator to form the IPN. The second temperature in the thermo-polymerizing process can be less than 80 centigrade degrees. In one embodiment, the second temperature is greater than 40 centigrade degrees, and less than 70 centigrade degrees. The second heating period ranges from about 5 hours to about 24 hours. In one embodiment, the second heating period is in a range from about 1 hour to about 12 hours, such as 2 hours, 8 hours. The second temperature and the second heating period can be determined by the amounts and types of the first and second monomers.

In one embodiment, the first monomer is polyethyleneglycol dimethacrylate (PEGdiA), and the second monomer is methoxy polyethylene glycol monoacrylate (PEGmA). That is to say, the IPN is mainly formed by polymerizing PEGdiA with PEGmA. Specifically, a method for making the IPN can include the following steps: providing PEGdiA, PEGmA, and the initiator; mixing PEGdiA, PEGmA, and the initiator to form a mixture, and PEGdiA is less than 50% of PEGmA by weight; and then putting the mixture into the protective gas, and irradiating the mixture by a UV light or heating the mixture to substantially polymerize the PEGdiA with PEGmA under the initiator, thereby forming the IPN.

The IPN and the method for making the IPN can be further explained with the following examples.

EXAMPLE

A molecular structure of an IPN is substantially branched structure, like a tree. The molecular structure of the IPN is shown as the following chemical formula (1). Wherein, in the chemical formula (1), "∿∿∿" represents

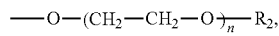

and each of the subscripts a, b, c, x, y, z, o, p, and q is an integer.

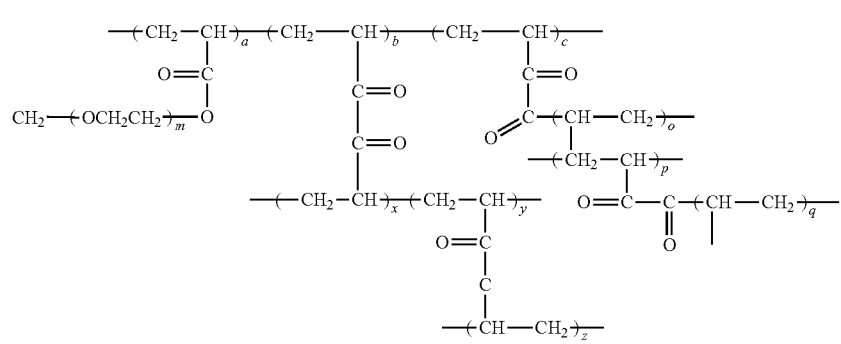

Chemical formula (1)

The IPN is made by a UV—in situ polymerization process. The method for making the IPN includes the following steps:

mixing PEG200diA with PEG350 mA according to PEG200diA being less than or equal to 50% of PEG350 mA by weight, thereby forming a first mixture, and then adding DMPA into the first mixture to form a mixture, wherein DMPA is about 0.1% of PEG350 mA by weight;

putting the mixture onto a Teflon plate in nitrogen gas; and using UV light with a wavelength about 365 nanometers to irradiate the mixture for about 60 minutes to substantially polymerizPEG350 mA with PEG200diA to form the IPN; and drying the IPN for about 8 hours at a temperature about 80 centigrade degrees to dry the IPN.

Wherein, PEG200diA and PEG350 mA react with each other under DMPA. A chemical reaction equation is shown as below:

Chemical Reaction Equation

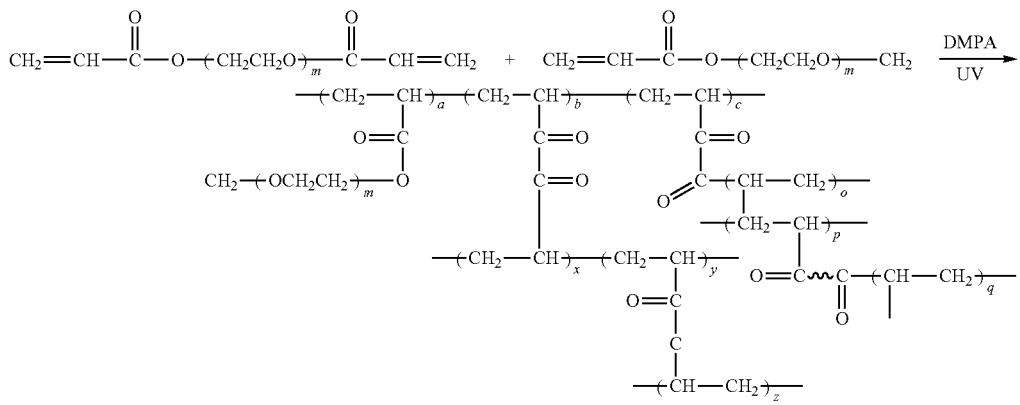

Figure 2:
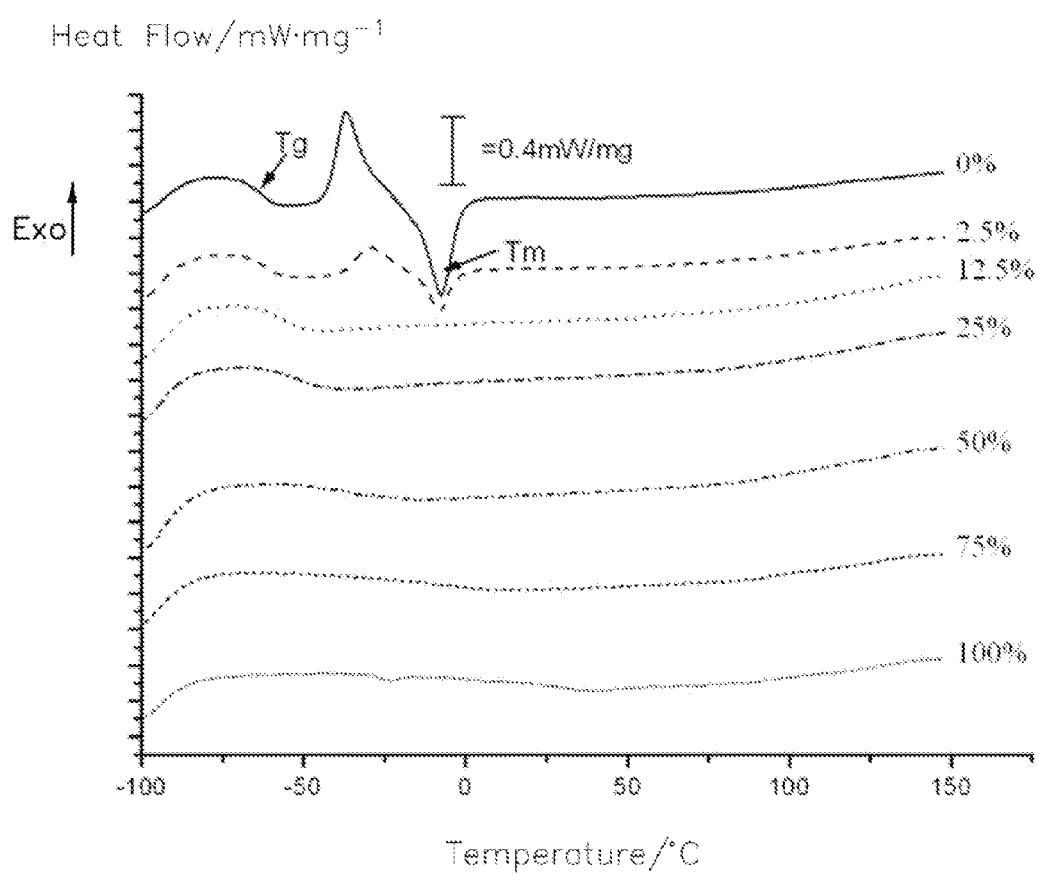
FIG. 2 shows differential scanning calorimetry (DEC) curves of IPNs with different weight ratios of polyethyleneglycol (200) dimethacrylate (PEG200diA) to methoxy polyethylene glycol (350) monoacrylate (PEG350 mA), wherein "200" in PEG200diA represents a molecular weight of the PEG group is about 200, and "350" in PEG350 mA represents a molecular weight of the PEG group is about 350.

Contents of the raw materials for making the IPN affect properties of the IPN. Details are shown as follow:

A glass transition temperature ($T_g$) is a characteristic feature of the amorphous phase of the IPN matrix. $T_g$ can be measured by DSC. A crystalline melting temperature ($T_m$) can reflect the crystalline structure of the IPN matrix. $T_m$ can also be measured by the DSC. Referring to FIG. 2 and table 1 shown as below, the weight ratio of PEG350 mA to PEG200diA is important for the thermal property of the IPN matrix. Wherein, in the table 1, "PEG200diA content by weight" represents that PEG200diA is about a certain percent of PEG350 mA by weight.

TABLE 1

| PEG200diA content by weight | $T_g$ (centigrade degrees) | $T_m$ (centigrade degrees) | $\Delta H_m$ (J/K) |
| --- | --- | --- | --- |
| 0 | −63.7 | −7.5 | −22.25 |
| 2.5% | −61.1 | −8.0 | −10.69 |
| 12.5% | −57.1 | — | — |
| 25% | −52.8 | — | — |

Wherein $\Delta H_m$ stands for an enthalpy change from PEG350 mA and PEG200diA to the IPN, and is related to the ether group.

$T_g$ of the IPN matrix increases and the $T_g$ peak becomes weaker with an increase of the PEG200diA content. When the PEG200diA content is higher than 50%, the $T_g$ peak will disappear. The DSC curves become more linear, which may result from the increase of the PEG200diA content. Crosslinking degrees of the IPN matrix are higher and higher as the PEG200diA content increases, which decreases mobility of branched chains in the IPN matrix. The decrease of the mobility of branched chains in the IPN matrix will greatly hinder lithium ion (Li$^+$) migration. Therefore, PEG200diA should be lower than 50% of PEG350 mA by weight in the IPN matrix.

In addition, $T_m$ is appeared in the samples with PEG200diA content of 0% and 2.5% of PEG350 mA by weight, and the temperature at about −7.5 centigrade degrees and −8 centigrade degrees respectively. The crosslinking of the IPN may inhibit the ordered arrangement of branched chains in the IPN, which results in the crystallization degree of the IPN being low.

Figure 3:
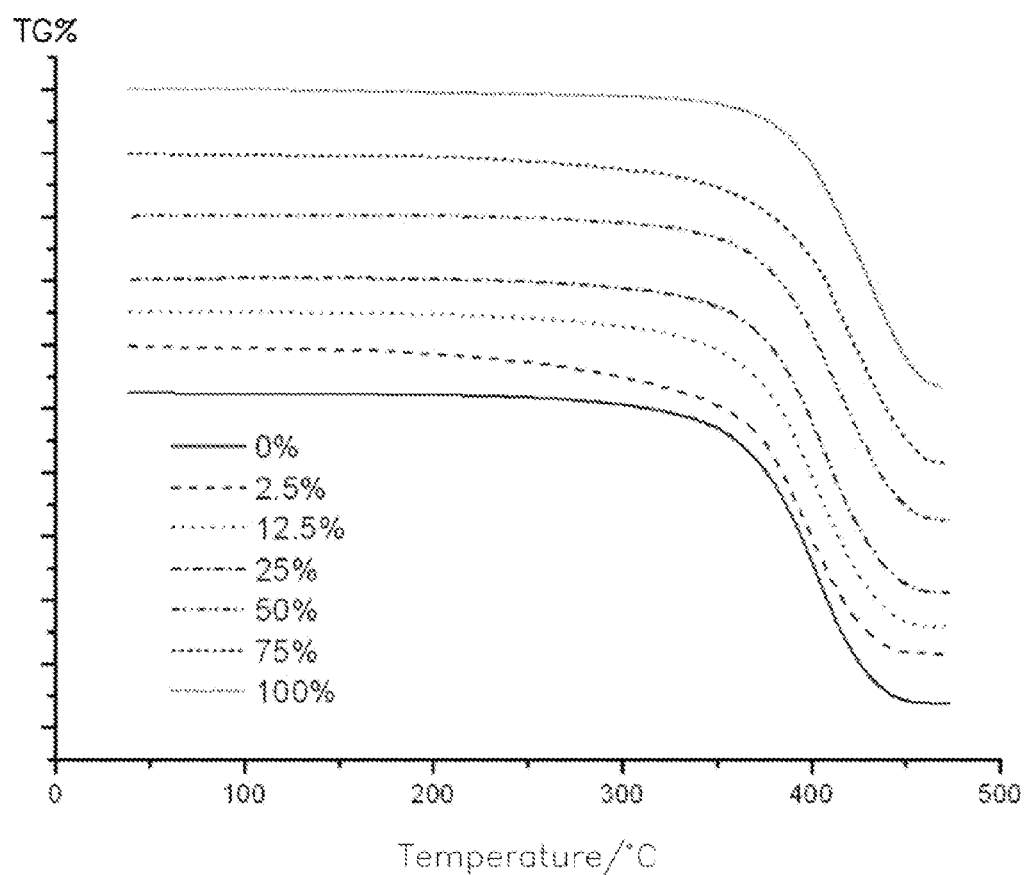
FIG. 3 shows thermo-gravimetric (TG) curves of IPNs with different weight ratios of PEG200diA to PEG350 mA.

The thermal stability of the IPN is investigated by TG analysis, as shown in FIG. 3. "TG %" in FIG. 3 stands for a weight of the IPN at a working temperature is a certain percent of an original weight of the IPN. It shows that the thermal stability of the IPN is slightly better than either PEG350 mA or PEG200diA. In detail, the starting degradation temperature of IPN is ranged from about 330 centigrade degrees to about 350 centigrade degrees. Therefore, the IPN is thermal stable. A lithium based battery using a solid polymer electrolyte including the IPN, is safe.

The IPN has a low crystallization degree. As such, the mobility of the branched chains in the IPN is weak, and the crystallization degree is low. The IPN has a high $T_g$, good thermal stability, and electro-chemical stability. If the IPN is applied in a solid polymer electrolyte, the solid polymer electrolyte will have excellent ionic conductivity, thermal stability, and electro-chemical stability. In addition, the method for making the SPE is simple.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making an interpenetrating polymer network, comprising:

providing a first monomer, a second monomer and a thermo-initiator, wherein a formula of the first monomer is

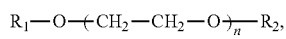

a formula of the second monomer is

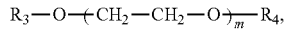

each "$R_1$", "$R_2$" and "$R_3$" comprises —C=C— group or —C≡C— group, "$R_4$" is an alkyl group or a hydrogen (H), "m" and "n" respectively represents an integer number, and a molecular weight of the first monomer or the second monomer is greater than or equal to 100 and less than or equal to 800;

mixing the first monomer, the second monomer and the thermo-initiator to form a mixture, wherein the first monomer in the mixture is less than or equal to 50% of the second monomer by weight; and putting the mixture into a protective gas, and heating the mixture at a temperature for a period, to polymerize the first monomer with the second monomer to form the interpenetrating polymer network under the thermo-initiator.

2. The method of claim 1, wherein each "$R_1$", "$R_2$" and "$R_3$" comprises an unsaturated chain hydrocarbon group.

3. The, method of claim 2, wherein each "$R_1$", "$R_2$" and "$R_3$" comprises ethenyl (—CH=CH$_2$), ethynyl (—C≡CH), allyl (—CH=CH—CH$_3$, or —(Ch$_3$)—C=CH$_2$), propinyl (—C≡C—CH$_3$), or ethenyl ketonic group

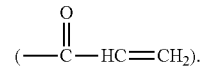

4. The method of claim 1, wherein the molecular weight of the first monomer or the molecular weight of the second monomer is greater than or equal to 200 and less than or equal to 600.

5. The method of claim 1, wherein the mixing the first monomer, the second monomer and the initiator to form the mixture comprises steps of mixing polyethyleneglycol (200) dimethacrylate with methoxy polyethylene glycol (350) monoacrylate with a predetermined ratio to form a middle mixture, and then adding the thermo-initiator into the middle mixture.

6. The method of claim 1, wherein the thermo-initiator is selected from the group consisting of chloride gas, bromine gas, organic peroxide, and azo initiator.

7. The method of claim 1, wherein the temperature ranges from about 40 centigrade degrees to about 80 centigrade degrees, the period ranges from about 0.5 hours to about 24 hours.

8. The method of claim 5, wherein the interpenetrating polymer network is:

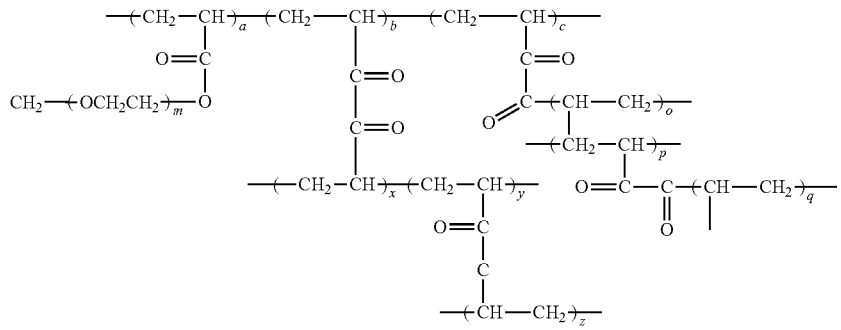

wherein, in the chemical formula, "⌇⌇⌇" represents

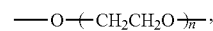

and all of the subscripts a, b, c, x, y, z, o, p, and q are integers.

9. The method of claim 1, wherein a material of the first monomer is PEGdiA, and a material of the second monomer is PEGmA.

* * * * *